United States Patent [19]

Hager et al.

[11] 4,200,417
[45] Apr. 29, 1980

[54] ARRANGEMENT FOR WITHDRAWING PARTICLES OF MATERIAL REMOVED BY A WORKING TOOL

[75] Inventors: Klaus Hager, Winterbach; Klaus Voss, Stuttgart, both of Fed. Rep. of Germany

[73] Assignee: Robert Bosch GmbH, Stuttgart, Fed. Rep. of Germany

[21] Appl. No.: 880,893

[22] Filed: Feb. 23, 1978

[30] Foreign Application Priority Data

Apr. 6, 1977 [DE] Fed. Rep. of Germany ....... 2715378

[51] Int. Cl.$^2$ ................... B23Q 11/06; B24B 55/06; B27G 21/00
[52] U.S. Cl. ......................................... 408/67; 51/273; 83/100; 144/251 A; 144/252 R; 409/134; 408/241 G
[58] Field of Search .............. 408/67, 56, 58, 712, 408/241 G; 144/134 B, 251 A, 252 R; 51/273; 83/100; 29/DIG. 84, DIG. 86; 403/104, 326, 377; 409/134, 254

[56] References Cited

U.S. PATENT DOCUMENTS

| | | | |
|---|---|---|---|
| 2,957,375 | 10/1960 | Howlett | 408/56 |
| 3,786,846 | 1/1974 | Mehring | 51/273 X |
| 3,837,383 | 9/1974 | Ko | 144/251 A |
| 3,905,273 | 9/1975 | Shook | 409/134 |

FOREIGN PATENT DOCUMENTS

| | | | |
|---|---|---|---|
| 2110924 | 9/1972 | Fed. Rep. of Germany | 408/712 |
| 2453791 | 5/1976 | Fed. Rep. of Germany | 408/58 |
| 2302167 | 9/1976 | France | 408/67 |

*Primary Examiner*—Z. R. Bilinsky
*Attorney, Agent, or Firm*—Michael J. Striker

[57] ABSTRACT

An arrangement for withdrawing particles of material removed by a working tool of a machine tool during a machining process, comprises a working frame adapted to support a machine tool, casing forming an at least partially closed chamber adapted to surround the working tool so as to accommodate the particles of material removed during machining process, port elements communicating with the chamber and adapted to be connected to a suction source so as to aspirate the particles from the chamber, and mounting elements for mounting the casing on the working frame so that the chamber surrounds the working tool when the machine tool is supported by the working frame.

19 Claims, 6 Drawing Figures

ARRANGEMENT FOR WITHDRAWING PARTICLES OF MATERIAL REMOVED BY A WORKING TOOL

BACKGROUND OF THE INVENTION

The present invention relates to an arrangement for withdrawing particles of material removed by a working tool of a machine tool during a machining process.

Arrangement of this type have been proposed in the prior art in which a sleeve of casing means for accommodating particles of removed material is mounted on a spindle bearing neck of the machine tool. In this case it is impossible to clamp the machine tool in a working frame and to perform with the machine tool such processes which require the machine tools to be clamped in the working frame, for instance various drilling operations, many grinding operations and almost all milling operations. During grinding and milling operations great amounts of material is removed, particularly in form a dust and short chips which dirty the surrounding place and the operators. In the known arrangement a second sleeve is constantly biased toward the workpiece so as to sealingly abut against the latter. However, a sufficient flow of aspirating air can be built only in the case when an upper surface of the workpiece is not uniform, that is when gaps remain between the lower edge of the thus-biased second sleeve for passage of the air. A seal provided on the front edge of the biased sleeve makes the desirable aspiration practically impossible.

An arrangement for drilling machines or the like has been also known, which operates as a dust exhauster and must be mounted on the drilling machine. This arrangement also includes a sleeve mounted on the drilling machine and a movable sleeve which is biased by a spring toward the workpiece. In an older dust aspirating arrangement for stone machining machine tools, an aspirating sleeve is coaxially mounted on a shaft of the stone machining machine tool, and a second so-called holding sleeve is movably connected with the above-mentioned first sleeve. The second sleeve abuts against the stone to be machined by means of an aspirating hood mounted on the second sleeve. This arrangement has the same disadvantages which the first-mentioned arrangement has.

SUMMARY OF THE INVENTION

Accordingly, it is an object of the present invention to provide an arrangement for withdrawing particles of material removed by a working tool of a machine tool during a machining process, which avoids the disadvantages of the prior art.

More particularly it is an object of the present invention to provide an arrangement for withdrawing particles of material removed by a working tool of a machine tool during a machining process, which assures aspiration of dust and chips not only in the case when freely movable machine tools, for instance, for drilling stone, are used, but also during drilling, milling, grinding and other operations in which machine tools are clamped in a working frame.

Another feature of the present invention is to provide an arrangement for withdrawing particles of material removed by a working tool of a machine tool during a machining process, which sealingly engage the surface of the workpiece to be machined, and at the same time does not interrupt the flow of the aspirated air.

In keeping with these objects and with others which will become apparent hereinafter, one feature of the present invention, briefly stated, resides in an arrangement for withdrawing particles of materials removed by a working tool of a machine tool during a machining process, including a working frame adapted to support a machine tool, casing means forming a chamber adapted to surround the working tool so as to accommodate the particles of material removed during machining process, port means communicating with the chamber with a suction source so as to aspirate the particles from the chamber, wherein means for mounting the casing means on the working frame is provided, so that the chamber surrounds the working tool when the machine tool is supported by the working frame.

When the mounting means mount the casing means on the working frame, the arrangement may be used not only for freely movable machine tools, but also for machine tools which are clamped in the mounting frame and perform drilling, milling, grinding and other operations.

Another feature of the present invention is that the casing means may include one sleeve immovably mounted on the working frame, and another sleeve which is movable relative to the one sleeve between a plurality of locations and fixable in each of the plurality of locations. The one sleeve can be mounted on a portion of the working frame which receives the machine tool therein. The sleeves may be substantially rigid, and may be constituted of a transparent material.

Still another feature of the present invention is that the other sleeve has an opening for aspirating air therethrough. This feature is very important and assures that the casing means may sealingly abut against the workpiece to be machined, on the one hand, and at the same time the aspirated air is not prevented from entering the casing means, on the other hand.

A further feature of the present invention is that one of the sleeves is formed as an outer sleeve, and the other of the sleeves is formed as an inner sleeve, and that fixing means is provided for fixing the outer sleeve to the inner sleeve in each of the plurality of locations. The fixing means may include a spring member surrounding the outer sleeve, particularly received in a groove provided therein, and partially extending inwardly beyond the outer sleeve through throughgoing apertures provided in the latter so as to frictionally engage the inner sleeve and to thereby fix the outer sleeve to the latter. The spring member may be formed as a worm spring or a helical spring.

The movable sleeve may be located inside the immovable sleeve, or outside the latter.

A still further feature of the present invention is that the port means is connected to a suction device by the connecting means, which latter is mounted on the working frame.

An additional feature of the present invention is that the immovable sleeve is mounted on the working frame by means of a spring member surrounding the immovable sleeve and biasing the latter into fixing engagement with a collar provided on the working frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
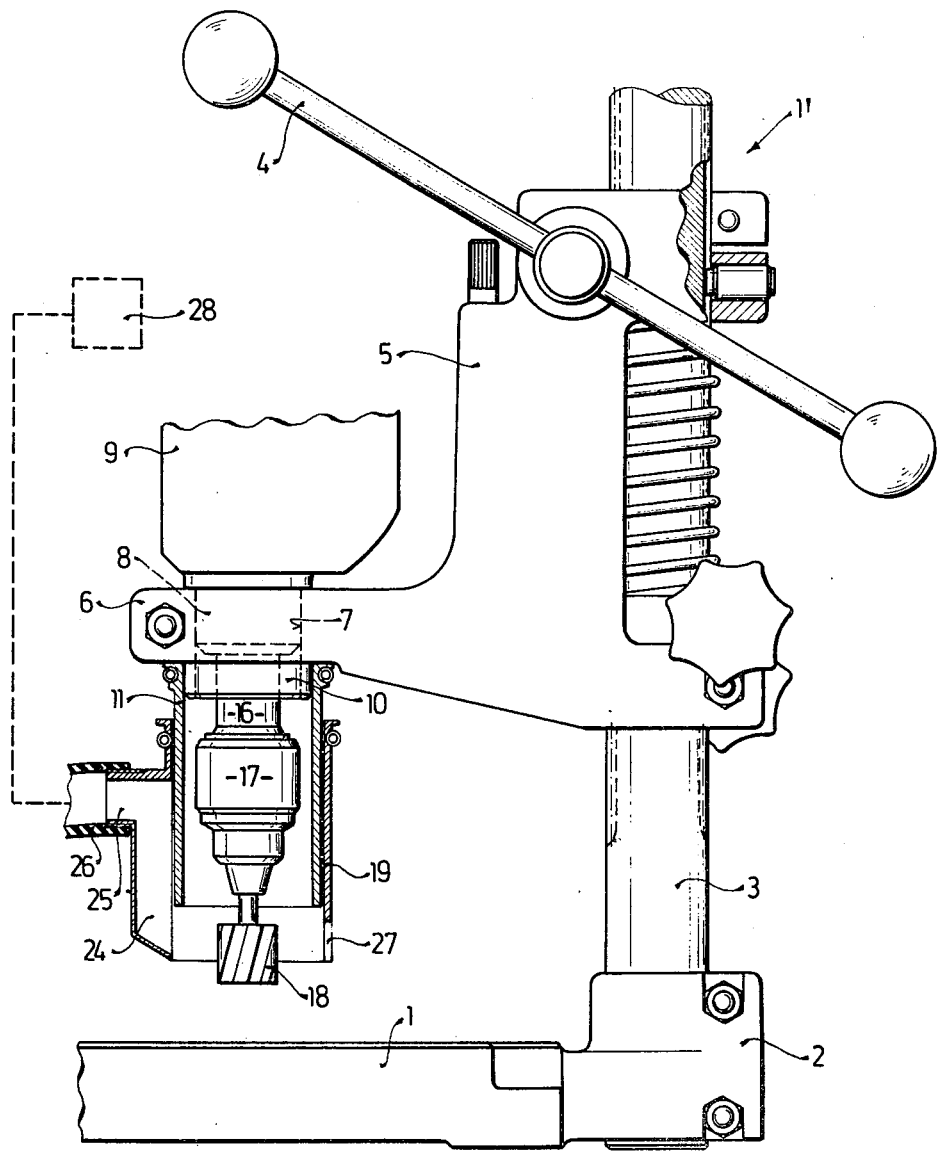
FIG. 1 is a partially sectioned view of an arrangement for withdrawing particles of material removed by a working tool of a machine tool during a machining process, in accordance with one embodiment of the present invention.

FIG. 1 shows an arrangement for withdrawing particles of material removed by a working tool of a machine tool during a machining process. The arrangement includes a working frame 1' which has a base plate 1 provided with a boss 2. A cylindrical upright guiding column 3 is clamped in the boss 2 of the base plate 1. A holding member 5 is movably mounted on the guiding column 3 by means of a lever 4 for downward and upward movement. The holding member 5 has an arm 6 facing away from the guiding column 3 and provided with a bore 7.

Figure 2:
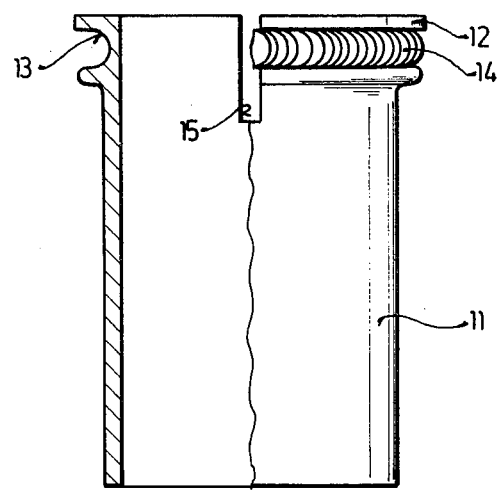
FIG. 2 is an enlarged view of one sleeve of casing means of the arrangement shown in FIG. 1.

A spindle bearing neck 8 of an electrical hand drilling machine 9 is clamped in the bore 7 of the arm 6 of the holder member 5. A cylindrical collar 10 is provided on the arm 6 of the holder member 5, which collar 10 is coaxial with the bore 7 and faces toward the base plate 1 of the working frame 1'. The arrangement includes a first sleeve 11 and a second sleeve 19. The first sleeve 11 is fitted on the collar 10 of the arm 6 of the holder member 5. The first sleeve 11 has a flange 12 adjacent to the upper end facing toward the holding member 5 and provided with a groove 13. As shown in FIG. 2, a circumferentially closed worm spring 14 is received in the groove 13 of the sleeve 11. Axial slots 15 are provided in the region of the reinforcing flange 12 of the first sleeve 11. The worm spring 14 biases the first sleeve 11 toward the collar 10 of the arm 6 of the holder member 5 and thereby holds the first sleeve 11 on the holder member 5 of the working frame 1'.

Figure 4:
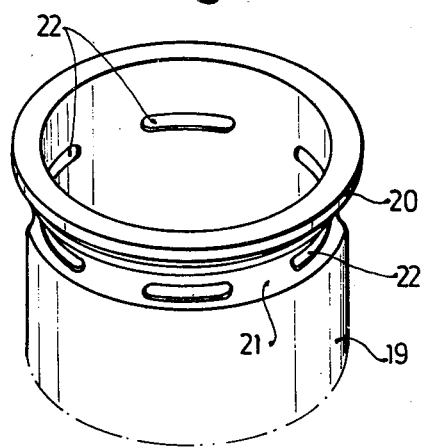
FIG. 4 is a perspective view of an upper section of the sleeve shown in FIG. 3.
Figure 3:
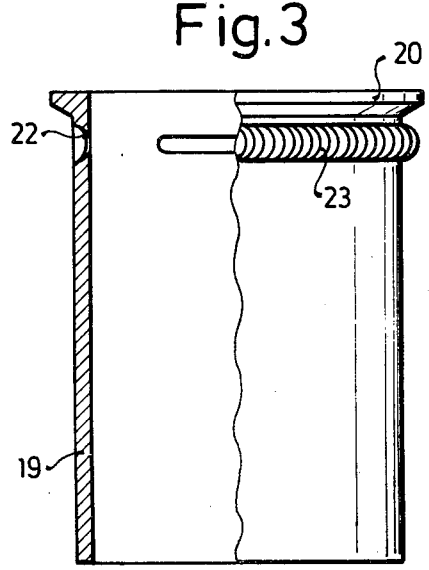
FIG. 3 is an enlarged view showing another sleeve of the casing means of the arrangement shown in FIG. 1.

A spindle 16 of the drilling machine 9 extends through the collar 10 of the arm 6 of the holding member 5 and carries a clamping jack 17 in which for instance a miller 18 is clamped. The first sleeve 11 coaxially surrounds the clamping jack 17. The cylindrical second sleeve 19 is fitted on the first sleeve 11, as can be more clearly seen from FIGS. 3 and 4. The second sleeve 19 has also at its end facing towards the holding member, a reinforcing flange 20 provided with a groove 21. The bottom of the groove 21 has several, preferably three or four elongated throughgoing apertures 22. A worm spring 23 is received in the groove 21 and extends radially inwardly beyond the inner surface of the second sleeve 19 through the apertures 22. The thus-extending worm spring 23 engages the first sleeve 11 and forms springy clamping means which can fix the second sleeve 19 in each of a plurality of desired locations of the second sleeve 19 relative to the first sleeve 11.

A suction passage 24 is formed on the outer cylindrical wall of the second sleeve 12 and merges into the suction socket 25. A pipe 26 is fitted on the suction socket 25 and leads to a dust aspirating arrangement which is shown schematically and identified with reference numeral 28. The suction passage 24 has an air aspirating opening 27 provided in the second sleeve 19 in the region facing toward the base plate 1. Since the second sleeve 19 is movable relative to the first sleeve 11, the suction socket 25 and the pipe 26 can be rotated in any desirable direction. The sleeves are preferably constituted by a transparent material, so that the working zone can be observed during machining processes.

Figure 5:
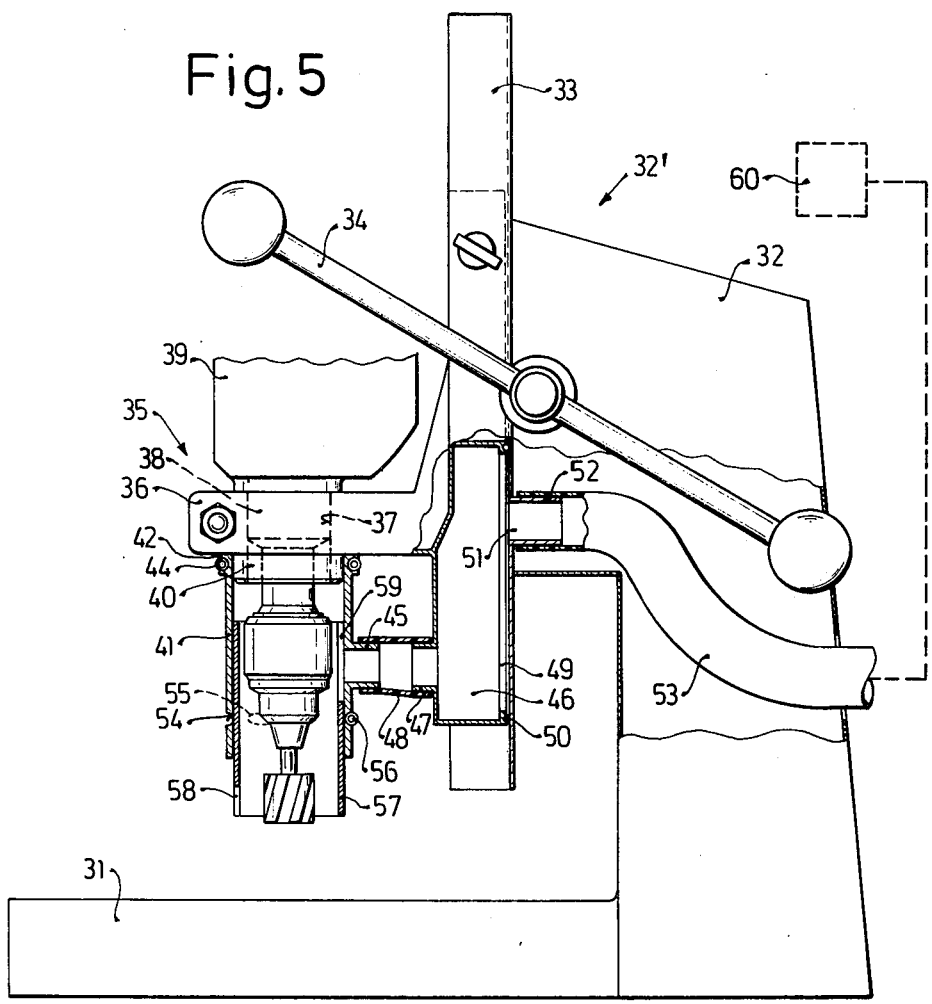
FIG. 5 is a partially sectioned view showing an arrangement for withdrawing particles of material removed by a working tool of a machine tool during a machining process, in accordance with another embodiment of the present invention.
Figure 6:
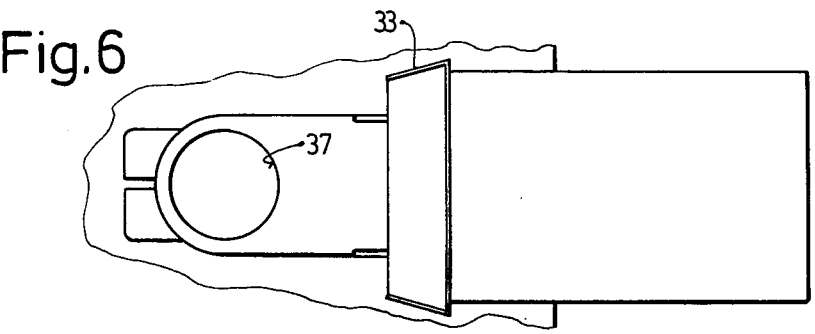
FIG. 6 is a plan view of the arrangement shown in FIG. 5.

FIGS. 5 and 6 show an arrangement for withdrawing particles of material removed by a working tool of a machine tool during a machining process, in accordance with another embodiment of the present invention. The arrangement includes a base plate 31, a working frame 32' having a support 32 which is connected to the base plate 31, and a dove-tailed guide 33 which is located above the base plate 31 and normal to the latter. A holding member 35 is movably mounted on the guide 33 by means of a lever 34. The holding member 35 has an arm 36 provided with a bore 37 which is normal to the base plate 31. A spindle bearing neck 38 of an electric handdrilling machine 39 is clamped in the bore 37.

A collar 40 is formed on the arm 36 of the holding member and faces toward the base plate 31. The bore 37 is formed in the collar 40. A first sleeve 41 is fixedly mounted on the collar 40, similarly to that of the first embodiment of the invention, by means of a worm spring 44 located on a reinforcing upper flange 42. However, in this case this sleeve is formed as an outer sleeve and has a suction socket 45 facing toward the support 32 and the guide 33. The part, by which the holding member 35 is guided on the guide 33, is formed as a suction box 46. The suction box 46 has a socket 47 which faces toward the drilling machine and is connected with the suction socket 45 of the first sleeve by means of the pipe 48.

The suction box 46 has a slot 49 which is provided in the region opposite to the socket 47 and is parallel to the guide 33. The slot 49 is surrounded by a seal 50 which is placed in a groove. During upward and downward movement of the holding member 35 the slot 49 slides near a bore 51 provided in the guide and communicating with a suction device 60 by means of a socket 52 and a suction pipe 53.

The first sleeve 41 has, in the region of its lower end, a groove 54 with several throughgoing apertures 55. A worm spring 56 is located in the groove with pre-stress and inwardly extends beyond the inner surface of the first sleeve 41 through the throughgoing apertures so as to frictionally engage a second sleeve 57, whereby the second sleeve 57 is movably mounted on the first sleeve 41. In the FIG. 5 the worm spring 56 is shown only in the right-half of the first sleeve 41. An air aspirating opening 55 is provided in the second sleeve 57 in the region of its lower end. An axial slot 59 is formed in the region of the upper end of the second sleeve 57 and is movable relative to the suction socket 45 of the first sleeve.

In accordance with a simplified embodiment of the present invention, a chamber for accommodating particles of material removed during a machining process may be formed as a single sleeve. Small variations in the length of the machine tools such as the miller 18, must be adjusted in this case by clamping the spindle bearing neck 8 in various vertical locations. It is also possible to form a chamber by a longitudinally slotted sleeve which is located only in the region of a working tool tip. The chamber may be also formed by a shield member extending circumferentially over 270° so as to surround about ¾ of the working tool. In the case of the thus-formed simplified open chamber, it is necessary to take care that the dimensions of the suction conduit must be sufficiently great. For this reason, for instance when a simplified chamber is formed similar to that shown in FIG. 5, the end of the socket 47 or the pipe 44 must be located as close as possible to the working location of the workpiece. The sleeve 41 may be connected with the collar by means of a clamping member provided in the upper region of the sleeve.

It will be understood that each of the elements described above, or two or more together, may also find a useful application in other types of constructions, differing from the types described above.

While the invention has been illustrated and described as embodied in an arrangement for withdrawing particles of material removed by a working tool of a machine tool during a machining process, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims.

1. An arrangement for withdrawing of material removed by a working tool of a machine tool during a machining process, comprising a working frame adapted to support a machine tool; casing means forming an at least partially closed chamber adapted to surround the working tool so as to accommodate the particles of material removed during the machining process, said casing means including two sleeves movable one within another has been inserted; port means communicating with said chamber and adapted to be connected to a suction source so as to aspirate the particles from said chamber; connecting means for connecting said port means to the suction source, said connecting means being mounted on said working frame, said working frame having a hollow portion forming a suction box which communicates with the suction source, on the one hand, and with said chamber of said casing means on the other hand, so as to form said connecting means; and means for mounting said casing means on said working frame so that said chamber surrounds said working tool when said machine tool is supported by said working frame, said mounting means immovably connecting one of said sleeves to said working frame, whereas the other of said sleeves is movable relative to said one sleeve between a plurality of locations and fixable to said one sleeve in each of said plurality of locations.

2. The arrangement as defined in claim 1, wherein said machine tool is a power drill, and said working frame is a drill press stand to which said power drill is detachably connected.

3. The arrangement as defined in claim 1, wherein said working frame has a portion which receives the working tool therein, said mounting means immovably connecting said one sleeve to said receiving portion of said working frame.

4. The arrangement as defined in claim 3, wherein said receiving portion is a separate collar connected to said working frame, and said one sleeve has an upper section facing toward said collar, said mounting means fixing said upper section of said one sleeve to said collar of said working frame.

5. The arrangement as defined in claim 4, wherein said mounting means includes a clamping member provided in the region of said upper section of said one sleeve and fixing the latter to said collar of said working frame.

6. The arrangement as defined in claim 1, wherein said sleeves are substantially rigid.

7. The arrangement as defined in claim 1, wherein said sleeves are constituted of a transparent material.

8. The arrangement as defined in claim 1, wherein said other sleeve has an opening for aspirating air therethrough.

9. The arrangement as defined in claim 1, wherein said sleeves include an inner sleeve, and an outer sleeve surrounding said inner sleeve and connected with said port means; and further comprising fixing means for fixing said outer sleeve to said inner sleeve in each of said plurality of locations.

10. The arrangement as defined in claim 9, wherein said one immovable sleeve forms said inner sleeve, and said other movable sleeve forms said outer sleeve.

11. The arrangement as defined in claim 9, wherein said one immovable sleeve forms said outer sleeve, and said other movable sleeve forms said inner sleeve.

12. An arrangement as defined in claim 1, wherein said working frame has another portion which is immovable, said hollow portion of said working frame being connected with the machine tool and jointly movable with the latter relative to the immovable other portion of said working frame.

13. An arrangement as defined in claim 12, wherein said immovable other portion of said frame has a guide, said hollow portion of said working frame being guided in said guide of said immovable other portion during its movement relative to the latter.

14. An arrangement as defined in claim 1, and further comprising a suction conduit communicating the interior of said hollow portion of said working frame with the suction source.

15. An arrangement for withdrawing of material removed by a working tool of a machine tool during a machining process, comprising a working frame adapted to support a machine tool; casing means forming an at least partially closed chamber adapted to surround the working tool so as to accommodate the particles of material removed during machining process, said casing means including two sleeves movable one within another, one of said sleeves being immovably connected to said frame, whereas the other of said sleeves is movable relative to said one sleeve between a plurality of locations and fixable to said one sleeve in each of said plurality of locations, said sleeves including an inner sleeve, and an outer sleeve surrounding said inner sleeve and having through-going apertures; fixing means for fixing said outer sleeve to said inner sleeve in each of said plurality of locations, and including a spring member surrounding said outer sleeve and partially extending inwardly beyond said outer sleeve so as to frictionally engage said inner sleeve, whereby said outer sleeve is fixed to said inner sleeve; port means connected with said other sleeve so as to communicate with said chamber and adapted to be connected to a suction source so as to aspirate the particles from said chamber; and means for mounting said casing means on said working frame by immovably connecting said one sleeve to said working frame so that said chamber surrounds said working tool when said machine tool is supported by said working frame.

16. The arrangement as defined in claim 15, wherein said outer sleeve has an outer surface provided with a groove having a bottom wall, said apertures being formed in said bottom wall of said groove, said spring member being received in said groove.

17. The arrangement as defined in claim 15, wherein said spring member is a worm spring.

18. The arrangement as defined in claim 15, wherein said spring member is a helical spring.

19. An arrangement for withdrawing of material removed by a working tool of a machine tool during a machining process, comprising a working frame adapted to support a machine tool, said working frame having a portion which receives the working tool therein which portion is a separate collar connected to said working frame; casing means forming an at least partially closed chamber adapted to surround the working tool so as to accommodate the particles of material removed during machining process, said casing means including two sleeves movable one within another, one of said sleeves having an upper section facing forward said collar; port means communicating with said chamber and adapted to be connected to a suction source so as to aspirate the particles from said chamber; and means for mounting said casing means on said working frame so that said chamber surrounds said working tool when said machine tool is supported by said working frame, said mounting means immovably connecting said one sleeve to said working frame, whereas the other of said sleeves is movable relative to said one sleeve between a plurality of locations and fixable to said one sleeve in each of said plurality of locations, said mounting means fixing said upper section of said one sleeve to said collar of said working frame and including an endless helical spring surrounding said one sleeve and biasing the latter into fixing engagement with said collar of said working frame.

* * * * *